March 15, 1949.  H. E. KLEVE  2,464,319
AUTOMATIC WIRE CABLE GRIP
Filed Oct. 26, 1945
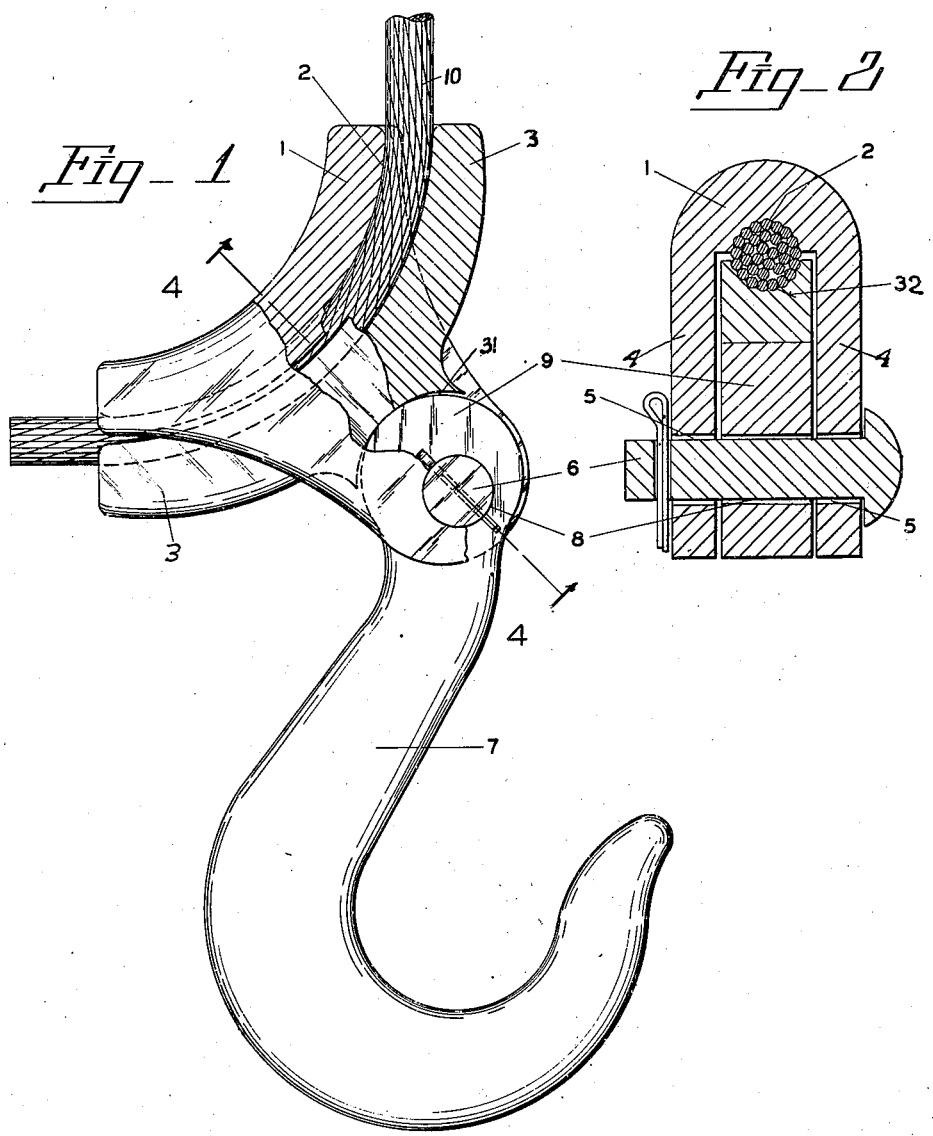
INVENTOR.
H. EDWARD KLEVE
BY
G. F. McDougall
ATTORNEY Patented Mar. 15, 1949

2,464,319

UNITED STATES PATENT OFFICE 2,464,319

AUTOMATIC WIRE CABLE GRIP

H. Edward Kleve, Portland, Oreg.

Application October 26, 1945, Serial No. 624,645

1 Claim. (Cl. 294—74)

This invention relates to an automatic wire cable grip that tightens under and in proportion to the load.

It is an object of the invention to furnish the art with a cable grip that will easily grip a cable at any point other than at an end, though it may be near the end and hold such gripped cable without crushing or kinking it up to or near the ultimate strength of the cable; further, that will release easily when the load is again taken off. Such a tool is very useful in pulling spans of cable across waterways and for many other purposes in setting rigging, that the rigger will at once see and understand from the following specification.

A drawing accompanies and forms a part hereof; said drawing is in two figures which illustrate the preferred form of the invention but are not intended to be exclusive of other forms employing the same principle.

In the drawing:

Fig. 1 is a side view of the cable grip with the gripping portion partly sectioned; and Fig. 2 is a cross-section on the line 4—4 of Fig. 1.

Further describing the drawing, numeral 1 represents a clevis-like structure formed with a curved cable seat 2; viewed alone the curve is convex. Numeral 3 is a concaved movable jaw that is slidably cooperatively mounted between the legs 4 of the clevis 1. The clevis 1 is provided with two eyes 5, for a pin 6, that is shown as readily removable. A hook 7, is provided with an eye 8, through which the pin 6 extends to hold the eye portion of the hook swingable in the clevis portion 1.

The eye portion of the hook 7, more particularly designated by numeral 9 is made eccentric by the eye 8 being placed off-center of said eye portion 9.

It is to be observed that the eccentric places the greatest thickness of metal just short of a line that would represent a load line if the upper end of the cable 10 were to be attached to something of the nature of a donkey engine drum that would apply heavy stress to the line 10 against a load carried by the hook 7. The cable is gripped by action of the eccentric seat 31 that cooperates with the eccentric eye portion 9 and at the same time serves as a retainer to prevent the movable jaw 3 from moving endwise enough to impair its function when there is no stress on the line or hook. The word "hook" is here used as generic to any sort of load engaging means that may be substituted for an actual hook and which incorporates the eccentric.

Due to the curved cable seats 2 and 32, there will be no kinking of the line or cable and if the cable seats are cast with spirals inside that match the size of cable used, the grip will be much stronger. Cables having the same number of strands, usually six, used on construction jobs, will be found to be all alike in strand size and pitch of the lay; hence such a cable grip, if made to fit a six strand three quarter inch cable, will fit all manufacturers' products of that size, accepting the full load the cable is designated to carry, without damage to the cable.

Having fully disclosed my invention so that anyone familiar with rigging manufacture and use can make and use it, what I claim as new and desire to secure by Letters Patent, is:

A cable grip comprising a clevis formed with opposite legs provided with an elongated convexly curved cable seat within its inside bottom surface, a slidable matching jaw concavely curved to match the cable seat in the clevis and provide a rounded cableway, and a hook swingably mounted between the legs of the clevis, said hook incorporating an eccentric portion that cooperates with a portion of said slidable jaw to close the same against a cable within the cableway when there is a load tending to stress the cable and the hook.

H. EDWARD KLEVE.

REFERENCES CITED

The following references are of record in the file of this patent:

UNITED STATES PATENTS

| Number | Name | Date |
|---|---|---|
| 332,619 | Moles | Dec. 15, 1885 |
| 2,009,861 | Skinner | July 30, 1935 |
| 2,187,440 | Adoplhe | Jan. 16, 1940 |
| 2,289,378 | Moran | July 14, 1942 |

FOREIGN PATENTS

| Number | Country | Date |
|---|---|---|
| 15,890 | Great Britain | July 18, 1904 |